(12) United States Patent
Liu et al.

(10) Patent No.: US 11,490,669 B1
(45) Date of Patent: Nov. 8, 2022

(54) LOCKABLE BEAMS FOR HAPTICS APPLICATIONS AND RELATED SYSTEMS AND METHODS

(71) Applicant: META PLATFORMS TECHNOLOGIES, LLC, Menlo Park, CA (US)

(72) Inventors: Tianshu Liu, Redmond, WA (US); Priyanshu Agarwal, Kirkland, WA (US); Amirhossein Amini, Seattle, WA (US); Maurizio Chiaramonte, San Francisco, CA (US); Yigit Menguc, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 323 days.

(21) Appl. No.: 16/843,667

(22) Filed: Apr. 8, 2020

Related U.S. Application Data

(60) Provisional application No. 62/831,368, filed on Apr. 9, 2019.

(51) Int. Cl.
*G06F 3/01* (2006.01)
*A41D 19/015* (2006.01)

(52) U.S. Cl.
CPC ....... *A41D 19/01588* (2013.01); *G06F 3/014* (2013.01); *G06F 3/016* (2013.01); *G06F 2203/013* (2013.01)

(58) Field of Classification Search
CPC ... A41D 19/01588; G06F 3/014; G06F 3/016; G06F 2203/013
See application file for complete search history.

(56) References Cited

U.S. PATENT DOCUMENTS

2017/0168576 A1* 6/2017 Keller .................. G06F 3/014

OTHER PUBLICATIONS

Fischer et al., "Use of a Portable Assistive Glove to Facilitate Rehabilitation in Stroke Survivors with Severe Hand Impairment", IEEE Transactions on Neural Systems and Rehabilitation Engineering, vol. 24, No. 3, 2015, pp. 1-9.
Rose et al., "A Hybrid Rigid-Soft Hand Exoskeleton to Assist Functional Dexterity", IEEE Robotics and Automation Letters, vol. 4, No. 1, Oct. 2018, pp. 1-8.
Shirazi-Adl et al., "Spinal muscle forces, internal loads and stability in standing under various postures and loads—application of kinematics-based algorithm", European Spine Journal, vol. 14, No. 4, 2005, pp. 381-392.
Shape memory alloys: Cho et al., "Multi-Axis SMA Actuator Array for Driving Anthropomorphic Robot Hand", Proceedings of the IEEE International Conference on Robotics and Automation, IEEE, Apr. 2005, pp. 1356-1361.

(Continued)

*Primary Examiner* — Mark W Regn
(74) *Attorney, Agent, or Firm* — FisherBroyles, LLP

(57) ABSTRACT

The disclosed lockable beams for haptics applications may include a rib structure including a plurality of ribs, a linking structure connecting the ribs to each other, a tendon extending along the rib structure, a tensioner coupled to the tendon for applying tension to the tendon, and a locking mechanism configured to, when engaged, impede relative movement between the tendon and the rib structure in a manner that impedes bending of the lockable beam. Various other methods, systems, and devices are also disclosed.

20 Claims, 10 Drawing Sheets

(56) References Cited

OTHER PUBLICATIONS

Agarwal et al., "An index finger exoskeleton with series elastic actuation for rehabilitation: Design, control and performance characterization", The International Journal of Robotics Research, vol. 34, No. 14, 2015, pp. 1-26.
Zhu et al., "Fluidic Fabric Muscle Sheets for Wearable and Soft Robotics", Soft Robotics, vol. 7, Issue 2, Apr. 3, 2020, pp. 1-19.

* cited by examiner

LOCKABLE BEAMS FOR HAPTICS APPLICATIONS AND RELATED SYSTEMS AND METHODS

CROSS REFERENCE TO RELATED APPLICATION

This application claims the benefit of U.S. Provisional Application No. 62/831,368, titled "LOCKABLE BEAMS FOR HAPTICS APPLICATIONS AND RELATES SYSTEMS AND METHODS," filed 9 Apr. 2019, the disclosure of which is incorporated, in its entirety, by this reference.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
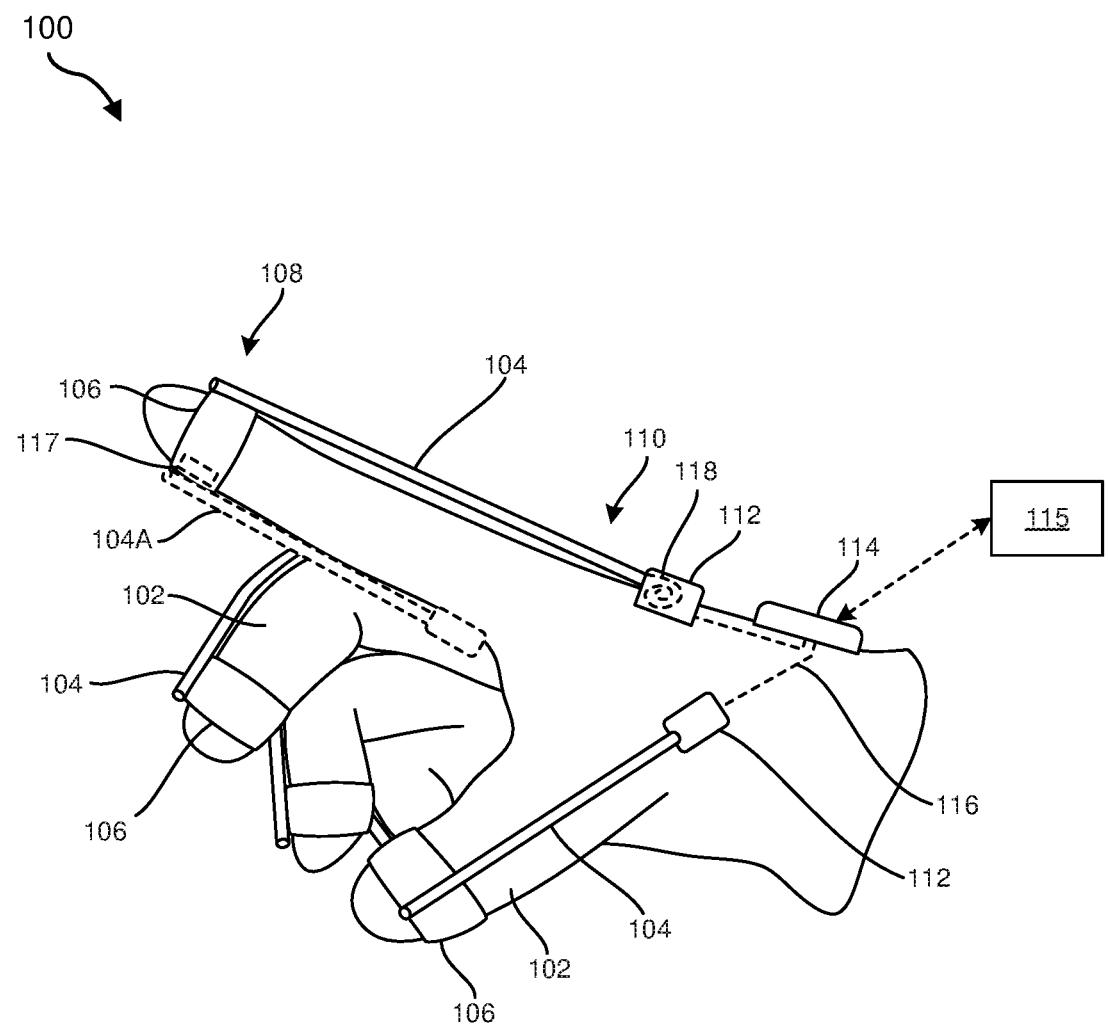
FIG. 1 is a perspective view of a wearable device, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Artificial-reality systems, such as virtual-reality systems and augmented-reality systems, typically display computer-generated content (often via a head-mounted display ("HMD")) to users in order to create immersive experiences. For example, a virtual-reality system may create three-dimensional ("3D") renderings to simulate an environment or a virtual space. Alternatively, augmented-reality systems may merge computer-generated content with a user's view of a real-world environment to enhance interactions with the real-world environment. These systems may provide users with the ability to navigate and alter digital content that may provide helpful information about real-world objects.

Although artificial-reality systems are commonly implemented for gaming and other entertainment purposes, such systems are also implemented for purposes outside of recreation. For example, governments may use them for military training simulations, doctors may use them to practice surgery, engineers may use them as visualization aids, and co-workers may use them to facilitate inter-personal interactions and collaboration from across the globe.

Some artificial-reality systems include handheld controllers that may be configured for a user to interact with content generated by the artificial-reality systems and displayed on an HMD. For example, a user may interact with a computer-generated object or image by reaching with the handheld controller in 3D space toward a perceived location of the object or image. The artificial-reality system may track the location and/or orientation of the handheld controller, such as optically and/or with the use of various sensors (e.g., a position sensor, an accelerometer, a gyroscope, a magnetometer, an inertial measurement unit ("IMU"), etc.). In addition, the user may interact with computer-generated content by manipulating one or more input elements on the handheld controller, such as a trigger, a button, a touch-sensitive pad, a joystick (e.g., a thumbstick), a glove finger, etc. When the user perceives to touch or otherwise interact with the computer-generated content, the handheld controller may provide haptic feedback to the user.

Some handheld or hand-worn accessories for artificial-reality systems may include force-feedback mechanisms to provide haptic feedback to the user. Force-feedback mechanisms often include motors that are configured to provide a sensation of movement and/or braking to simulate interaction with a real-world object or surface. For example, some gloves for use with artificial reality systems may include an elongated band along an inner or back side of the user's finger that is attached to a fingertip structure. The band may be tightened or stopped by a motor or other suitable mechanism to provide a sensation of the user's fingertip pressing against a real-world object. This action may be synchronized with the user's interaction with a virtual object to provide a physical feeling of pressing against or touching the virtual object. While such force feedback mechanisms have been employed to enhance the immersiveness of some artificial reality experiences, conventional handheld controllers that provide force feedback are often bulky, heavy, and/or complicated to manufacture and wear.

The present disclosure is generally directed to lockable beams for haptics applications, haptics gloves and other haptics wearables, and methods of forming haptics gloves and other haptics wearables. As will be explained in greater detail below, embodiments of the present disclosure may include a lockable beam that includes a rib structure with a tendon extending along the rib structure. The rib structure may inhibit collapsing of the lockable beam when the lockable beam is bent. A tensioner may be coupled to the tendon for applying tension to the tendon, such as to keep the tendon taut and/or to take up slack in the tendon during bending and straightening actions of the lockable beam. A locking mechanism may be positioned and configured to impede relative movement between the tendon and the rib structure, which in turn may impede (e.g., stop, reduce, or make more difficult) further bending of the lockable beam. In some embodiments, the lockable beams of the present disclosure may be substantially less bulky and easier to manufacture than many conventional haptics systems that are used to resist bending.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
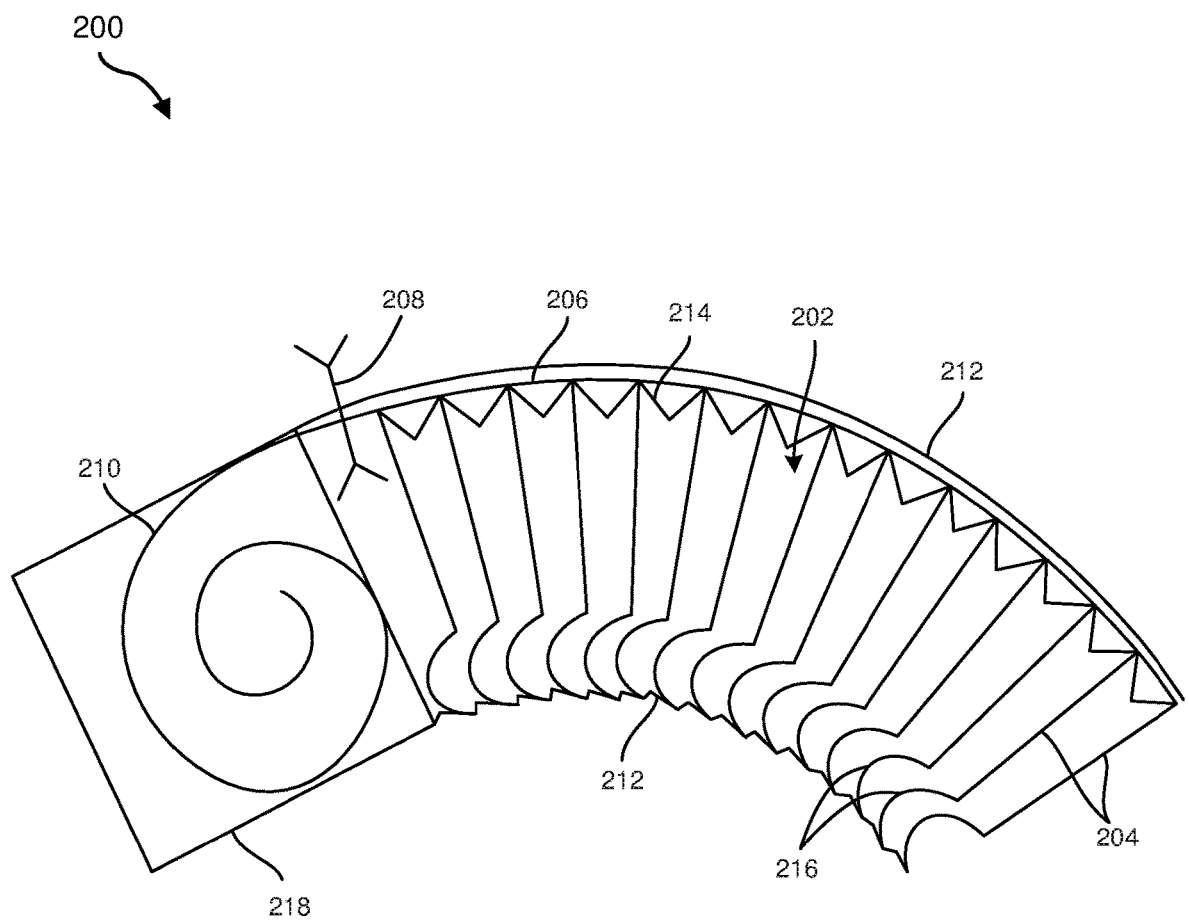
FIG. 2 is a schematic side view of a lockable beam, according to at least one embodiment of the present disclosure.
Figure 3:
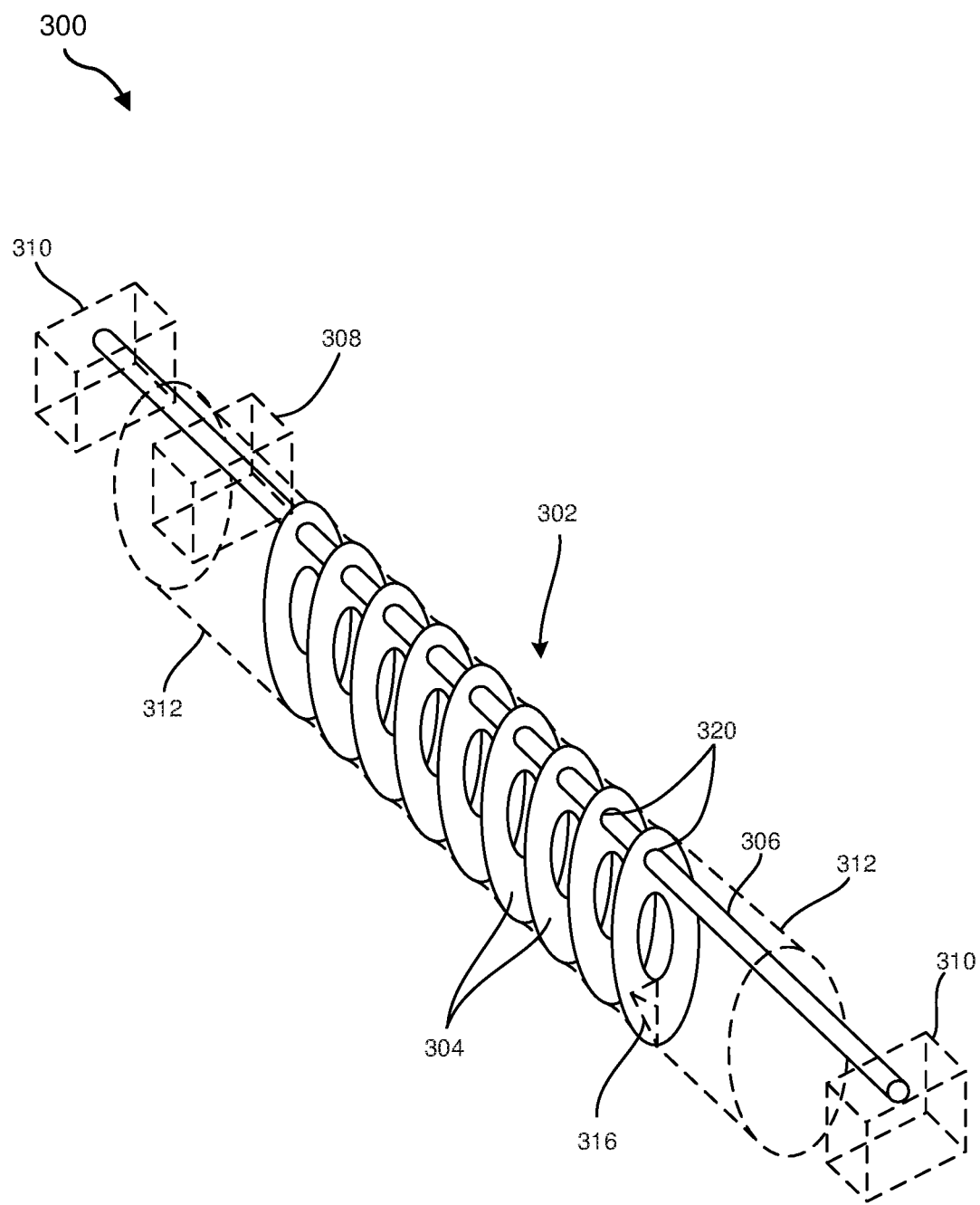
FIG. 3 is a cutaway perspective view of a lockable beam, according to at least one embodiment of the present disclosure.

The following will provide, with reference to FIG. 1, detailed descriptions of a wearable haptics device, such as a haptics glove. With reference to FIGS. 2 and 3, detailed descriptions of various example lockable beams for use in haptics applications will be provided. With reference to FIGS. 4A-4D, the following will provide detailed descriptions of various example locking mechanisms for use with lockable beams of the present disclosure. With reference to FIG. 5, the following will provide detailed descriptions of an example method of forming a haptics glove. With reference to FIGS. 6-10, the following will provide detailed descriptions of several artificial-reality devices, systems, and environments in which embodiments of the present disclosure may be employed.

FIG. 1 is a perspective view of a wearable device 100, according to at least one embodiment of the present disclosure. As illustrated in FIG. 1, the wearable device 100 may be in the form of a glove configured for wearing on an intended user's hand. Thus, the wearable device 100 is also referred to herein as glove 100, although the same concepts may apply to other wearable devices (e.g., sleeves, wristbands, etc.), such as wearable devices that may be configured to bend during operation (e.g., at an elbow, wrist, or other joint of the intended user).

The glove 100 may include finger portions 102 for positioning over the intended user's fingers. At least one lockable beam 104 may be positioned along one or more of the finger portions 102. The glove 100 may also include a finger pad 106 coupling a distal end region 108 of the lockable beam 104 to a fingertip region of the finger portion 102 of the glove 100. A proximal end region 110 of the lockable beam 104 may be coupled to a beam control element 112. In some examples, the terms "distal" and "proximal" may be in relation to a limb of the intended user.

A communications element 114 may be in communication with the respective beam control elements 112, such as via wired or wireless connections 116. In some embodiments, the communications element 114 may be mounted on the glove 100 (e.g., on a back portion of the glove 100) or on another device in communication with the glove 100 (e.g., on a wristband, on an HMD, etc.).

The lockable beam 104 may be configured to bend, such as when the intended user opens or closes a finger within the glove 100. For example, as the intended user closes a finger, the finger may apply a force to the finger pad 106, which may bend the lockable beam 104 from an initial position (e.g., a straight position) into a bent position (e.g., a curved position). When the force on the finger pad 106 is reduced or removed, the lockable beam 104 may return to the initial position or another (e.g., intermediate) position. In some embodiments, the lockable beam 104 may be biased to the initial (e.g., straight) position, such as with a spring or other biasing element 118. In additional embodiments, the intended user may force the lockable beam 104 back into the initial position by pressing the finger pad 106 into the initial position.

The beam control element 112 may be configured to cause the lockable beam 104 to lock when desired, such as to coincide with an action in an artificial-reality environment. For example, the user wearing the glove 100 may use an artificial-reality HMD in connection with the glove 100. When the intended user reaches to grasp an object displayed on the HMD, the user may close fingers within the glove 100 around the object at a perceived spatial location of the object. The locking action of the lockable beam 104 may inhibit (e.g., make more difficult or stop) further bending of the lockable beam 104. For example, activation of the beam control element 112 in response to a signal from the communications element 114 may result in inhibiting further bending of the lockable beam 104. When the lockable beam 104 is locked, the user's finger may press against the finger pad 106, providing a haptic cue that the user is grasping or otherwise touching the object.

The communications element 114 may be configured to receive and/or send signals (e.g., wired or wireless signals) between the lockable beam(s) 104 and a controller 115, such as a controller of an artificial-reality system. For example, the communications element 114 may receive signals from the controller 115 instructing one or more of the lockable beams 104 to be locked at a given time or position and may send signals to the controller 115 indicative of a position of the lockable beam(s) 104, a force applied by the user's finger on the lockable beam 104 via the finger pad 106, etc. One or more feedback sensors 117 may be mounted on the lockable beam 104, the finger pad 106, and/or the glove 100. For example, the feedback sensors 117 may include an IMU, a pressure sensor, a flex sensor (e.g., a sensor configured to sense bending), a position sensor, an accelerometer, a proximity sensor, etc.

As illustrated in FIG. 1, one lockable beam 104 may be respectively positioned along and coupled to each of the finger portions 102 of the glove 100. In additional embodiments, the glove 100 may include only one or two lockable beams 104, such as along the finger portions 102 configured to be worn on the intended user's forefinger and thumb. In some examples, the lockable beam 104 may be positioned along a back of the respective finger portion 102, as shown in FIG. 1. In additional examples, the lockable beams 104 may be positioned along a lateral side or an inner side of the finger portions 102. For example, FIG. 1 illustrates a lockable beam 104A positioned along an inner side of the finger portion 102. In some embodiments, positioning the lockable beam 104A along the inner side of the finger portion 102 may provide a different user experience, such as by removing a potential reaction force on a user's joint or knuckle, which may improve a sensation of immersion when the user grasps a virtual object. As shown in FIG. 1, one lockable beam 104 may be coupled to each respective finger portion 102. In additional embodiments, two or more lockable beams 104 may be coupled to each respective finger portion 102 of the glove 100.

FIG. 2 is a schematic side view of a lockable beam 200, according to at least one embodiment of the present disclosure. The concepts described with reference to lockable beam 200 may be employed in any of the lockable beams 104 described above. The lockable beam 200 may include a rib structure 202 including a plurality of ribs 204. A tendon 206 may extend along the rib structure 202. A locking mechanism 208 may be positioned and configured to, when engaged, impede relative movement between the tendon 206 and the rib structure 202. A tensioner 210, which may include a rotational spring, may be coupled to the tendon 206 and may be configured to apply tension to the tendon 206. A sheath 212 may at least partially surround the rib structure 202. At least a portion of the sheath 212 may include a flexible material that is configured to bend, such as a flexible polymer material, a fabric material, a composite material, etc.

The rib structure 202 may be configured to inhibit collapsing of the lockable beam 200 when bent. For example, each of the ribs 204 of the rib structure 202 may extend transverse (e.g., perpendicular) to a length of the lockable beam 200 to provide stiffness across a width of the lockable beam 200. The ribs 204 may each have any suitable shape for providing transverse stability to the lockable beam 200, such as circular, triangular, rectangular, oval, etc. In some examples, the shape of the ribs 204 may correspond to a cross-sectional shape of the lockable beam 200.

A linking structure 214 may connect the ribs to each other and may be configured to maintain the ribs 204 substantially perpendicular to a centroid of the lockable beam 200 (e.g., a central axis extending through a center of the lockable beam 200 along its length) during bending of the lockable beam. For example, the linking structure 214 may keep at least a portion of the ribs 204 linked to and apart from each other, such as at a substantially equal distance from each other. At least one side (e.g., an outer side when the lockable beam 200 is bent, one or both lateral sides, an inner side, or any combination thereof) of each of the ribs 204 may be coupled to the linking structure 214. The linking structure 214 may be foldable, such as to enable the linking structure 214 to be extended and compressed, respectively, during bending and straightening of the lockable beam 200. In some embodiments, the linking structure 214 may be integrated with (e.g., a part of) the sheath 212.

In some examples, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least 90% met, at least 95% met, at least 99% met, or fully met.

In some examples, each of the ribs 204 may include an interlocking feature 216 for interlocking each of the ribs 204 to adjacent ribs 204 of the rib structure 202. The interlocking feature 216 may be positioned proximate to an inner side of the lockable beam 200 relative to a bending curvature of the lockable beam 200. For example, the interlocking feature 216 may include a protrusion configured to be at least partially positioned within a corresponding recess in an adjacent rib 204. The interlocking features 216 may be engaged with each other when the lockable beam 200 is bent, when the lockable beam 200 is straight, or both. For example, the interlocking features 216 may act as pivot points for the various ribs 204 when the lockable beam 200 is bent.

The rib structure 202 may be positioned along substantially an entire length of the lockable beam 200. In additional embodiments, multiple distinct rib structures 202 may be positioned at certain positions along the beam 200, such as to correspond to locations of the user's knuckles or other bendable joints, with rigid portions of the lockable beam 200 between the rib structures 202.

The tendon 206 may be bendable but may resist stretching along its length. For example, the tendon 206 may include a composite material (e.g., a carbon fiber reinforced fabric material, a fiberglass material, etc.), a metal strip material, a polymer strip material, a rope, etc. The tendon 206 may be positioned along the rib structure 202 (e.g., along an outer side of the rib structure 202 relative to a bending curvature of the lockable beam 200) and may be configured to lengthen and shorten as the rib structure 202 is respectively bent and straightened. For example, the tension applied to the tendon 206 by the tensioner 210 may keep the tendon 206 taut and/or take up slack in the tendon 206 as the lockable beam 200 is bent and straightened. The tensioner 210 may be positioned in a tensioner housing 218, which may be located at an end of the lockable beam 200 or at an intermediate position in the lockable beam 200, such as adjacent to the rib structure 202. Although the tensioner 210 is illustrated in FIG. 2 as a rotational spring, the present disclosure is not so limited. For example, the tensioner 210 may be composed of a linear spring, an electromechanical actuator (e.g., a rotational motor, a linear actuator, etc.), a leaf spring, or any other suitable element or mechanism for applying tension to the tendon 206.

When it is desired to stop bending of the lockable beam 200, the locking mechanism 208 may be actuated to impede relative movement between the tendon 206 and the rib structure 202. For example, as the lockable beam 200 is bent, such as by a grasping motion of the user's finger, the outer side of the lockable beam 200 and the tendon 206 may lengthen to accommodate the curvature of the lockable beam 200. At a certain position (e.g., a position determined by an associated artificial-reality system), the locking mechanism 208 may be actuated to stop movement between the tendon 206 and the rib structure 202, which may inhibit the tendon 206 from continuing to lengthen. The stopped relative movement between the tendon 206 and the rib structure 202 may, in turn, result in resistance to further bending of the lockable beam 200. This resistance to further bending may provide haptic feedback to the user, such as a sensation that the user is grasping or touching a physical object.

The locking mechanism 208 may include any actuator configured to inhibit relative movement between the tendon 206 and the rib structure 202. In some embodiments, the tendon 206 may be or include a shape-memory alloy ("SMA") material, and the locking mechanism 208 may be configured to apply a sufficient electrical voltage to the SMA material to stop or reverse lengthening of the SMA material. In additional embodiments, the locking mechanism 208 may include an electromechanical actuator positioned and configured to apply a braking force against the tendon 206. Various example electromechanical actuators that are suitable for use as the locking mechanism 208 are illustrated in FIGS. 4A-4D and are explained below.

Additionally or alternatively, a tendon 206 and locking mechanism 208 may be positioned along an inner side of the rib structure 202 relative to the bending curvature of the lockable beam 200. In this arrangement, the tendon 206 and locking mechanism 208 may be configured to resist straightening of the lockable beam 200 when the locking mechanism 208 is actuated. A lockable beam 200 with the tendon 206 and locking mechanism 208 along the inner side may be useful for providing resistance to straightening the lockable beam 200, such as to provide haptic feedback that a back of a user's finger touches or pushes against an object (e.g., a virtual object in an artificial-reality environment). In some embodiments, a single lockable beam 200 may include a tendon 206 and corresponding locking mechanism 208 along its outer side and another tendon 206 and corresponding locking mechanism 208 along its inner side.

FIG. 3 is a cutaway perspective view of a lockable beam 300, according to at least one embodiment of the present disclosure. The concepts described with reference to lockable beam 300 may be employed in any of the lockable beams 104 or 200 described above. The lockable beam 300 may include a rib structure 302 including a plurality of ribs 304. A tendon 306 may extend along the rib structure 302. A locking mechanism 308 may be positioned and configured to, when engaged, inhibit relative movement between the tendon 306 and the rib structure 302. At least one tensioner 310, which may include a rotational spring, a linear spring, an electromechanical actuator, etc., may be coupled to the tendon 306 and may be configured to apply tension to the tendon 306. As shown in FIG. 3, in some examples, a first tensioner 310 may be coupled to a first end of the tendon 306 and a second tensioner 310 may be coupled to a second, opposite end of the tendon 306. A sheath 312 may at least partially surround the rib structure 302. An interlocking structure 316 may be located on each of the ribs 304 and configured to interlock the ribs 304, such as on a side of the ribs 304 opposite the tendon 306. The interlocking structure 316 may facilitate bending of the lockable beam 300 in a desired direction, such as by constraining relative rotation of the ribs 304 to a predetermined rotational direction. By way of example, the interlocking structure 316 may be a part of the ribs 304 and/or the sheath 312 may act as the interlocking structure 316.

In some examples, relational terms, such as "first," "second," "inner," "outer," etc., may be used for clarity and convenience in understanding the disclosure and accompanying drawings and may not necessarily connote or depend on any specific preference, orientation, or order, except where the context clearly indicates otherwise.

As illustrated in FIG. 3, the tendon 306 may pass through apertures 320 in the ribs 304. Alternatively, the tendon 306 may pass along an external side of the ribs 304 (e.g., along an outer side of the ribs 304 relative to a curvature of the lockable beam 300 when bent, like the embodiment shown in FIG. 2) rather than through the ribs 304. In addition, the tendon 306 is shown in FIG. 3 as having a generally circular cross-section. However, the present disclosure is not so limited. Rather, the tendon 306 can have another shape, such as a flattened strip shape.

The sheath 312 may act as a linking structure to maintain the ribs 304 substantially perpendicular to a centroid of the lockable beam 300 as the lockable beam 300 is bent. For example, the ribs 304 may be secured to the sheath 312 along at least a portion (e.g., an entirety) of a perimeter of each of the ribs 304, such as via an adhesive, stitching, a weld, or a press-fit. In some embodiments, an inner portion of the sheath 312 (relative to a curvature of the lockable beam 300 when bent) may act as the interlocking feature 316 to couple the inner portions of the ribs 304 to each other.

FIGS. 4A-4E are schematic side views of various locking mechanisms 400A-400E, according to various embodiments of the present disclosure. The locking mechanism 400A shown in FIG. 4A may include a rotatable cam 402 positioned adjacent to a tendon 406. When the rotatable cam 402 is rotated against the tendon 406, the rotatable cam 402 may press the tendon 406 against an opposing surface 404 to pinch the tendon 406 between the rotatable cam 402 and the opposing surface 404. This pinching may impede longitudinal movement of the tendon 406. Rotation of the rotatable cam 402 may be accomplished with a rotatable motor, a linear actuator acting on the rotatable cam 402 away from its pivot point, a gear mechanism (e.g., intermeshing gears, a rack and pinion, etc.), a pulley mechanism, or any other suitable actuator.

Figure 4A:
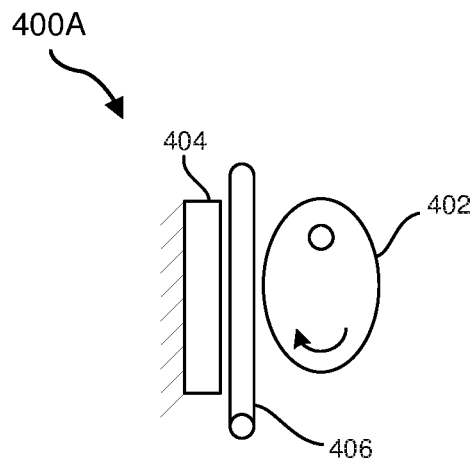
FIGS. 4A-4E are schematic side views of various locking mechanisms, according to various embodiments of the present disclosure.
Figure 4B:
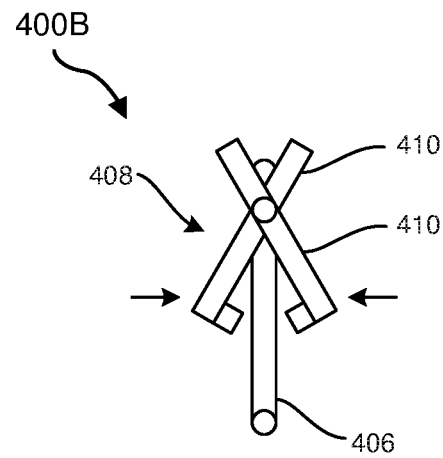
Figure 5:
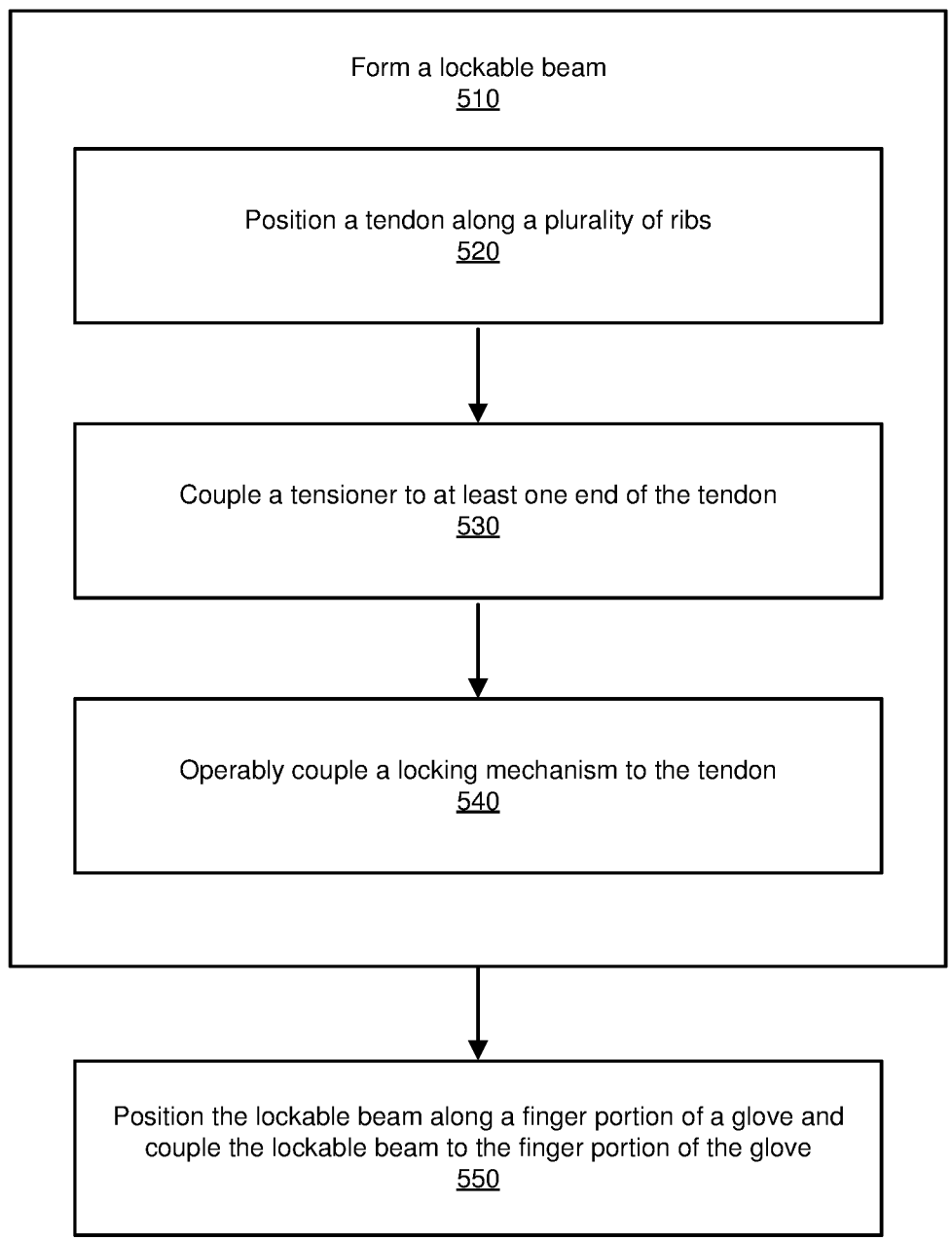
FIG. 5 is a flow diagram illustrating a method of forming a haptics glove, according to at least one embodiment of the present disclosure.

The locking mechanism 400B shown in FIG. 4B may include a clamp 408. Actuation of the clamp 408 may result in pinching the tendon 406 between arms 410 of the clamp to impede longitudinal movement of the tendon 406. Actuation of the clamp 408 may be accomplished with a rotatable motor, a linear actuator acting on one or both arms of the clamp 408, an SMA wire wrapped around the arms of the clamp 408, a pulley mechanism, a gear mechanism, or any other suitable actuator.

Figure 4C:
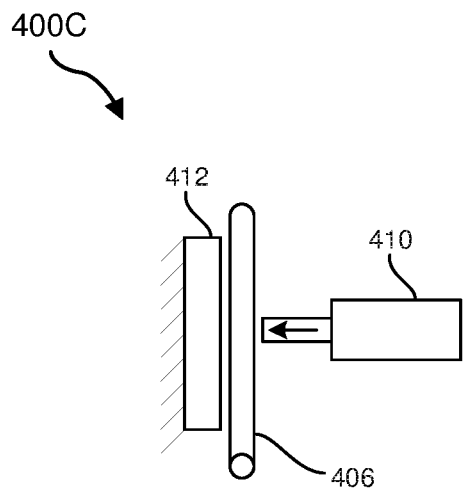

The locking mechanism 400C shown in FIG. 4C may include a linear actuator 410 configured to directly act on the tendon 406. For example, actuation of the linear actuator 410 may press the tendon 406 against an opposing surface 412 to pinch the tendon 406, impeding longitudinal movement of the tendon 406. The linear actuator may include, for example, a solenoid, a voice-coil actuator, or any other suitable linear actuator.

Figure 4D:
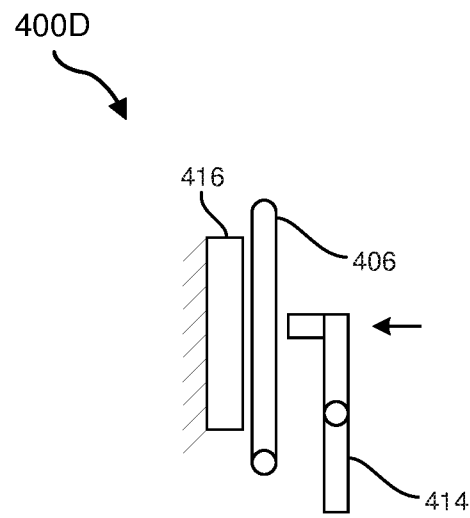

The locking mechanism 400D shown in FIG. 4D may include a lever arm 414. When actuated, the lever arm 414 may pivot to press the tendon 406 against an opposing surface 416 to impede longitudinal movement of the tendon 406. The lever arm 414 may be actuated by a rotatable motor, a linear actuator, a gear mechanism, a pulley mechanism, or any other suitable actuator.

Figure 4E:
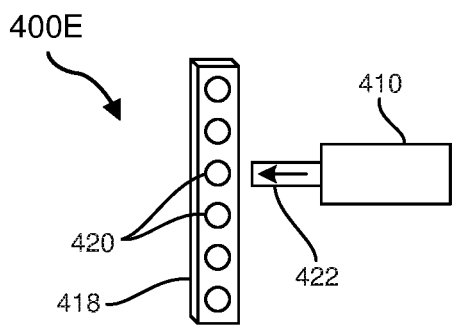

The locking mechanism 400E shown in FIG. 4E may include a linear actuator 410 that is configured to engage a perforated tendon 418 to stop linear motion of the perforated tendon 418. For example, the perforated tendon 418 may include perforations 420 that are sized for receiving at least a portion of an output shaft 422 of the linear actuator 410. When the output shaft 422 is inserted into one of the perforations 420, relative movement between the perforated tendon 418 and the linear actuator 410 may be stopped. In additional embodiments, the linear actuator 410 may be replaced by another type of actuator, such as a lever arm, a clamp, a gear with gear teeth sized to be inserted into the perforations 420, etc.

The locking mechanisms 400A-400E are illustrated and described as example embodiments that may be suitable for different configurations of lockable beams. However, the present disclosure is not limited to the locking mechanisms 400A-400E shown and described. Other locking mechanisms may be suitable for impeding movement between a tendon and rib structure of a lockable beam.

FIG. 5 is a flow diagram illustrating a method 500 of forming a haptics glove, according to at least one embodiment of the present disclosure. At operation 510, a lockable beam may be formed. Operation 510 may be performed in a variety of ways, such as by performing operations 520, 530, and 540. For example, at operation 520, a tendon may be positioned along a plurality of ribs in a rib structure. The tendon may be bendable and resistant to stretching in a longitudinal direction. At operation 530, a tensioner may be coupled to at least one end of the tendon. For example, a rotational spring, a linear spring, or an electromechanical actuator may be coupled to the tendon to apply tension to the tendon. At operation 540, a locking mechanism may be operably coupled to the tendon. The locking mechanism may be configured to, when actuated, impede relative movement between the tendon and the rib structure, such as to inhibit bending of a lockable beam incorporating the tendon and rib structure.

In some embodiments, the lockable beam may be further formed by positioning a sheath around the rib structure and/or tendon. A linking structure, which may be a part of the sheath or may be a distinct element, may be coupled to the ribs of the rib structure to maintain the ribs substantially perpendicular to a centroid of the lockable beam. In some embodiments, one or more interlocking features may be configured to couple the ribs to each other, such as to form a pivot point for each of the ribs when the lockable beam is bent.

At operation 550, the lockable beam may be positioned along a finger portion of a glove. The lockable beam may be coupled to the finger portion of the glove, such as via a finger pad positioned at a fingertip end of the finger portion. In addition, the lockable beam may be coupled to the finger portion along a length of the lockable beam, such as by securing the lockable beam to the finger portion at discrete points or along substantially an entire length of the lockable beam (e.g., by inserting the lockable beam into a sleeve). The lockable beam may be positioned along a back side of the finger portion of the glove, along a lateral side of the finger portion, or along an inner side of the finger portion. In some embodiments, more than one lockable beam may be positioned along and coupled to the finger portion of the glove.

Accordingly, the present disclosure includes lockable beams, haptics wearables (e.g., gloves), and related methods that may improve haptics feedback in a variety of ways. For example, the lockable beams of the present disclosure may be relatively simple and cheap to manufacture, may be relatively small (e.g., compared to conventional haptics systems), and may be comfortable to use. In addition, the lockable beams according to some embodiments may be actuated quickly and consistently to provide an immersive experience for a user, such as a user of an artificial-reality system.

As noted above, embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 600 in FIG. 6) or that visually immerses a user in an artificial reality (such as, e.g., virtual-reality system 700 in FIG. 7). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 6:
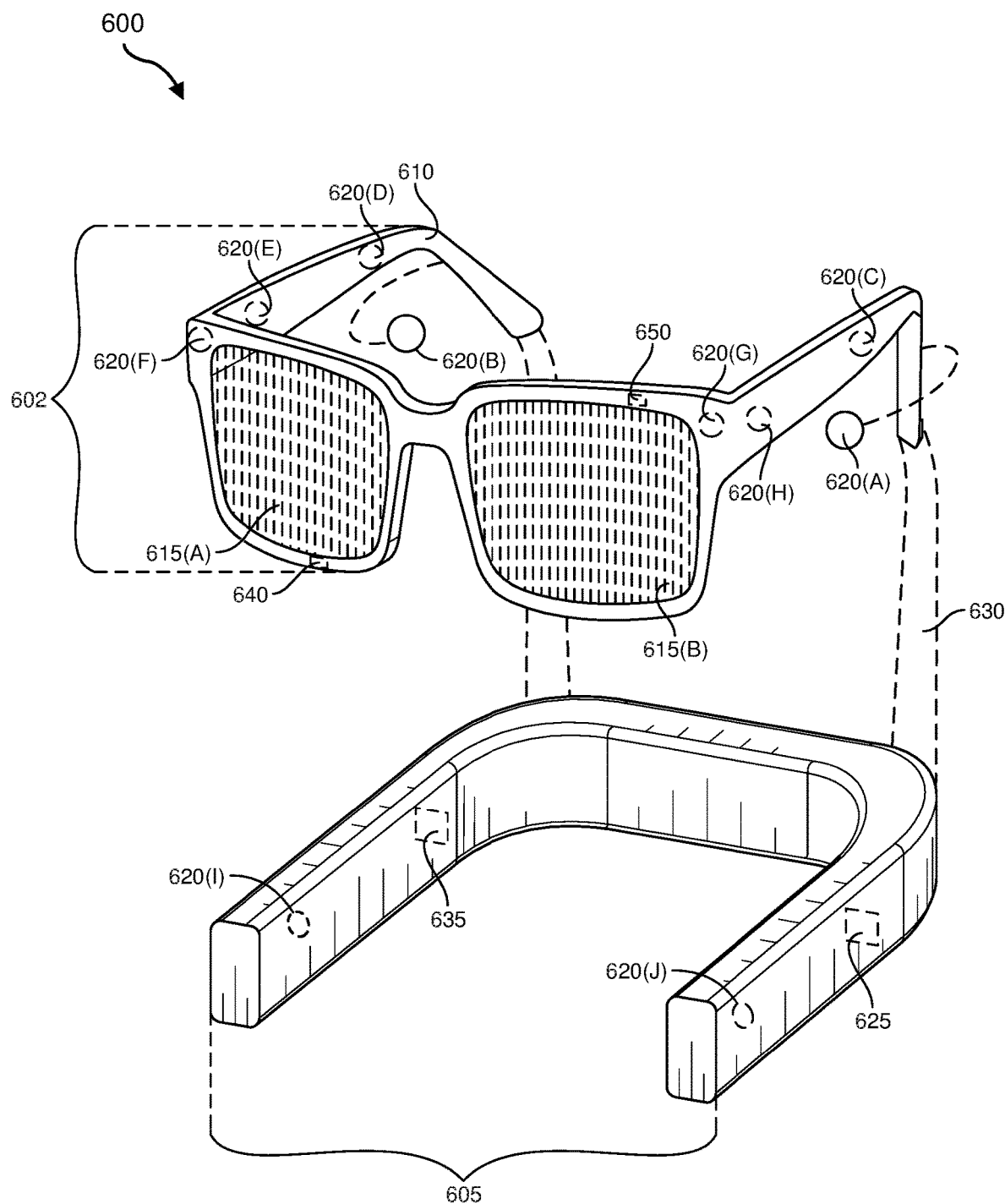
FIG. 6 is an illustration of exemplary augmented-reality glasses that may be used in connection with embodiments of this disclosure.

Turning to FIG. 6, the augmented-reality system 600 may include an eyewear device 602 with a frame 610 configured to hold a left display device 615(A) and a right display device 615(B) in front of a user's eyes. The display devices 615(A) and 615(B) may act together or independently to present an image or series of images to a user. While the augmented-reality system 600 includes two displays, embodiments of this disclosure may be implemented in augmented-reality systems with a single NED or more than two NEDs.

In some embodiments, the augmented-reality system 600 may include one or more sensors, such as sensor 640. The sensor 640 may generate measurement signals in response to motion of the augmented-reality system 600 and may be located on substantially any portion of the frame 610. The sensor 640 may represent one or more of a variety of different sensing mechanisms, such as a position sensor, an inertial measurement unit (IMU), a depth camera assembly, a structured light emitter and/or detector, or any combination thereof. In some embodiments, the augmented-reality system 600 may or may not include the sensor 640 or may include more than one sensor. In embodiments in which the sensor 640 includes an IMU, the IMU may generate calibration data based on measurement signals from the sensor 640. Examples of the sensor 640 may include, without limitation, accelerometers, gyroscopes, magnetometers, other suitable types of sensors that detect motion, sensors used for error correction of the IMU, or some combination thereof.

In some examples, the augmented-reality system 600 may also include a microphone array with a plurality of acoustic transducers 620(A)-620(J), referred to collectively as acoustic transducers 620. The acoustic transducers 620 may represent transducers that detect air pressure variations induced by sound waves. Each acoustic transducer 620 may be configured to detect sound and convert the detected sound into an electronic format (e.g., an analog or digital format). The microphone array in FIG. 6 may include, for example, ten acoustic transducers: 620(A) and 620(B), which may be designed to be placed inside a corresponding ear of the user, acoustic transducers 620(C), 620(D), 620(E), 620(F), 620 (G), and 620(H), which may be positioned at various locations on the frame 610, and/or acoustic transducers 620(I) and 620(J), which may be positioned on a corresponding neckband 605.

In some embodiments, one or more of the acoustic transducers 620(A)-(F) may be used as output transducers (e.g., speakers). For example, the acoustic transducers 620 (A) and/or 620(B) may be earbuds or any other suitable type of headphone or speaker.

The configuration of the acoustic transducers 620 of the microphone array may vary. While the augmented-reality system 600 is shown in FIG. 6 as having ten acoustic transducers 620, the number of the acoustic transducers 620 may be greater or less than ten. In some embodiments, using higher numbers of acoustic transducers 620 may increase the amount of audio information collected and/or the sensitivity and accuracy of the audio information. In contrast, using a lower number of acoustic transducers 620 may decrease the computing power required by an associated controller 650 to process the collected audio information. In addition, the position of each acoustic transducer 620 of the microphone array may vary. For example, the position of an acoustic transducer 620 may include a defined position on the user, a defined coordinate on the frame 610, an orientation associated with each acoustic transducer 620, or some combination thereof.

The acoustic transducers 620(A) and 620(B) may be positioned on different parts of the user's ear, such as behind the pinna, behind the tragus, and/or within the auricle or fossa. Or, there may be additional acoustic transducers 620 on or surrounding the ear in addition to the acoustic transducers 620 inside the ear canal. Having an acoustic transducer 620 positioned next to an ear canal of a user may enable the microphone array to collect information on how sounds arrive at the ear canal. By positioning at least two of the acoustic transducers 620 on either side of a user's head (e.g., as binaural microphones), the augmented-reality device 600 may simulate binaural hearing and capture a 3D stereo sound field around about a user's head. In some embodiments, the acoustic transducers 620(A) and 620(B) may be connected to the augmented-reality system 600 via a wired connection 630, and in other embodiments the acoustic transducers 620(A) and 620(B) may be connected to the augmented-reality system 600 via a wireless connection (e.g., a Bluetooth connection). In still other embodiments, the acoustic transducers 620(A) and 620(B) may not be used at all in conjunction with the augmented-reality system 600.

The acoustic transducers 620 on the frame 610 may be positioned in a variety of different ways, including along the length of the temples, across the bridge, above or below the display devices 615(A) and 615(B), or some combination thereof. The acoustic transducers 620 may also be oriented such that the microphone array is able to detect sounds in a wide range of directions surrounding the user wearing the augmented-reality system 600. In some embodiments, an optimization process may be performed during manufacturing of the augmented-reality system 600 to determine relative positioning of each acoustic transducer 620 in the microphone array.

In some examples, the augmented-reality system 600 may include or be connected to an external device (e.g., a paired device), such as the neckband 605. The neckband 605 generally represents any type or form of paired device. Thus, the following discussion of the neckband 605 may also apply to various other paired devices, such as charging cases, smart watches, smart phones, wrist bands, other wearable devices, hand-held controllers, tablet computers, laptop computers, other external compute devices, etc.

As shown, the neckband 605 may be coupled to the eyewear device 602 via one or more connectors. The connectors may be wired or wireless and may include electrical and/or non-electrical (e.g., structural) components. In some cases, the eyewear device 602 and the neckband 605 may operate independently without any wired or wireless connection between them. While FIG. 6 illustrates the components of the eyewear device 602 and neckband 605 in example locations on the eyewear device 602 and neckband 605, the components may be located elsewhere and/or distributed differently on the eyewear device 602 and/or neckband 605. In some embodiments, the components of the eyewear device 602 and neckband 605 may be located on one or more additional peripheral devices paired with the eyewear device 602, neckband 605, or some combination thereof.

Pairing external devices, such as the neckband 605, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 600 may be provided by a paired device or shared between a paired device and an eyewear device, thus reducing the weight, heat profile, and form factor of the eyewear device overall while still retaining desired functionality. For example, the neckband 605 may allow components that would otherwise be included on an eyewear device to be included in the neckband 605 since users may tolerate a heavier weight load on their shoulders than they would tolerate on their heads. The neckband 605 may also have a larger surface area over which to diffuse and disperse heat to the ambient environment. Thus, the neckband 605 may allow for greater battery and computation capacity than might otherwise have been possible on a standalone eyewear device. Since weight carried in the neckband 605 may be less invasive to a user than weight carried in the eyewear device 602, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 605 may be communicatively coupled with the eyewear device 602 and/or to other devices. These other devices may provide certain functions (e.g., tracking, localizing, depth mapping, processing, storage, etc.) to the augmented-reality system 600. In the embodiment of FIG. 6, the neckband 605 may include two acoustic transducers (e.g., 620(I) and 620(J)) that are part of the microphone array (or potentially form their own microphone subarray). The neckband 605 may also include a controller 625 and a power source 635.

The acoustic transducers 620(I) and 620(J) of the neckband 605 may be configured to detect sound and convert the detected sound into an electronic format (analog or digital). In the embodiment of FIG. 6, the acoustic transducers 620(I) and 620(J) may be positioned on the neckband 605, thereby increasing the distance between the neckband acoustic transducers 620(I) and 620(J) and other acoustic transducers 620 positioned on the eyewear device 602. In some cases, increasing the distance between the acoustic transducers 620 of the microphone array may improve the accuracy of beamforming performed via the microphone array. For example, if a sound is detected by the acoustic transducers 620(C) and 620(D) and the distance between the acoustic transducers 620(C) and 620(D) is greater than, e.g., the distance between the acoustic transducers 620(D) and 620 (E), the determined source location of the detected sound may be more accurate than if the sound had been detected by the acoustic transducers 620(D) and 620(E).

The controller 625 of the neckband 605 may process information generated by the sensors on the neckband 605 and/or the augmented-reality system 600. For example, the controller 625 may process information from the microphone array that describes sounds detected by the microphone array. For each detected sound, the controller 625 may perform a direction-of-arrival (DOA) estimation to estimate a direction from which the detected sound arrived at the microphone array. As the microphone array detects sounds, the controller 625 may populate an audio data set with the information. In embodiments in which the augmented-reality system 600 includes an inertial measurement unit, the controller 625 may compute all inertial and spatial calculations from the IMU located on the eyewear device 602. A connector may convey information between the augmented-reality system 600 and the neckband 605 and between the augmented-reality system 600 and the controller 625. The information may be in the form of optical data, electrical data, wireless data, or any other transmittable data form. Moving the processing of information generated by the augmented-reality system 600 to the neckband 605 may reduce weight and heat in the eyewear device 602, making it more comfortable to the user.

The power source 635 in the neckband 605 may provide power to the eyewear device 602 and/or to the neckband 605. The power source 635 may include, without limitation, lithium ion batteries, lithium-polymer batteries, primary lithium batteries, alkaline batteries, or any other form of power storage. In some cases, the power source 635 may be a wired power source. Including the power source 635 on the neckband 605 instead of on the eyewear device 602 may help better distribute the weight and heat generated by the power source 635.

As noted, some artificial-reality systems may, instead of blending an artificial reality with actual reality, substantially replace one or more of a user's sensory perceptions of the real world with a virtual experience. One example of this type of system is a head-worn display system, such as the virtual-reality system 700 in FIG. 7, that mostly or completely covers a user's field of view. The virtual-reality system 700 may include a front rigid body 702 and a band 704 shaped to fit around a user's head. The virtual-reality system 700 may also include output audio transducers 706(A) and 706(B). Furthermore, while not shown in FIG. 7, the front rigid body 702 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in the augmented-reality system 600 and/or the virtual-reality system 700 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in the augmented-reality system 600 and/or the virtual-reality system 700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, the augmented-reality system 600 and/or virtual-reality system 700 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, the artificial-reality systems 600 and 700 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 8:
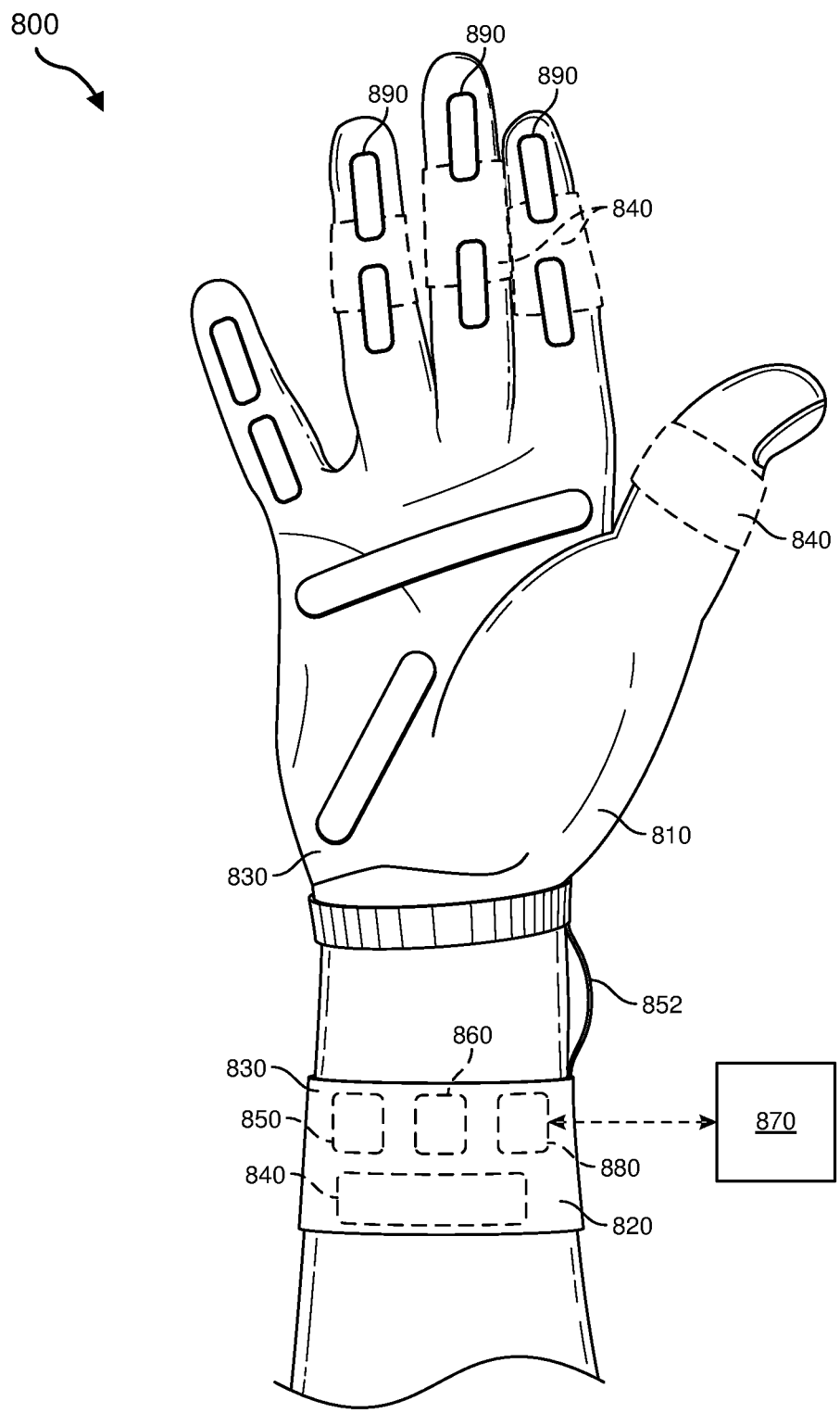
FIG. 8 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 8 illustrates a vibrotactile system 800 in the form of a wearable glove (haptic device 810) and wristband (haptic device 820). The haptic device 810 and the haptic device 820 are shown as examples of wearable devices that include a flexible, wearable textile material 830 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 840 may be positioned at least partially within one or more corresponding pockets formed in the textile material 830 of the vibrotactile system 800. The vibrotactile devices 840 may be positioned in locations to provide a vibrating sensation (e.g., haptic feedback) to a user of the vibrotactile system 800. For example, the vibrotactile devices 840 may be positioned against the user's finger(s), thumb, or wrist, as shown in FIG. 8. The vibrotactile devices 840 may, in some examples, be sufficiently flexible to conform to or bend with the user's corresponding body part(s).

A power source 850 (e.g., a battery) for applying a voltage to the vibrotactile devices 840 for activation thereof may be electrically coupled to the vibrotactile devices 840, such as via conductive wiring 852. In some examples, each of the vibrotactile devices 840 may be independently electrically coupled to the power source 850 for individual activation. In some embodiments, a processor 860 may be operatively coupled to the power source 850 and configured (e.g., programmed) to control activation of the vibrotactile devices 840.

The vibrotactile system 800 may be implemented in a variety of ways. In some examples, the vibrotactile system 800 may be a standalone system with integral subsystems and components for operation independent of other devices and systems. As another example, the vibrotactile system 800 may be configured for interaction with another device or system 870. For example, the vibrotactile system 800 may, in some examples, include a communications interface 880 for receiving and/or sending signals to the other device or system 870. The other device or system 870 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. The communications interface 880 may enable communications between the vibrotactile system 800 and the other device or system 870 via a wireless (e.g., Wi-Fi, Bluetooth, cellular, radio, etc.) link or a wired link. If present, the communications interface 880 may be in communication with the processor 860, such as to provide a signal to the processor 860 to activate or deactivate one or more of the vibrotactile devices 840.

The vibrotactile system 800 may optionally include other subsystems and components, such as touch-sensitive pads 890, pressure sensors, motion sensors, position sensors, lighting elements, and/or user interface elements (e.g., an on/off button, a vibration control element, etc.). During use, the vibrotactile devices 840 may be configured to be activated for a variety of different reasons, such as in response to the user's interaction with user interface elements, a signal from the motion or position sensors, a signal from the touch-sensitive pads 890, a signal from the pressure sensors, a signal from the other device or system 870, etc.

Although the power source 850, processor 860, and communications interface 880 are illustrated in FIG. 8 as being positioned in the haptic device 820, the present disclosure is not so limited. For example, one or more of the power source 850, processor 860, or communications interface 880 may be positioned within the haptic device 810 or within another wearable textile.

Figure 9:
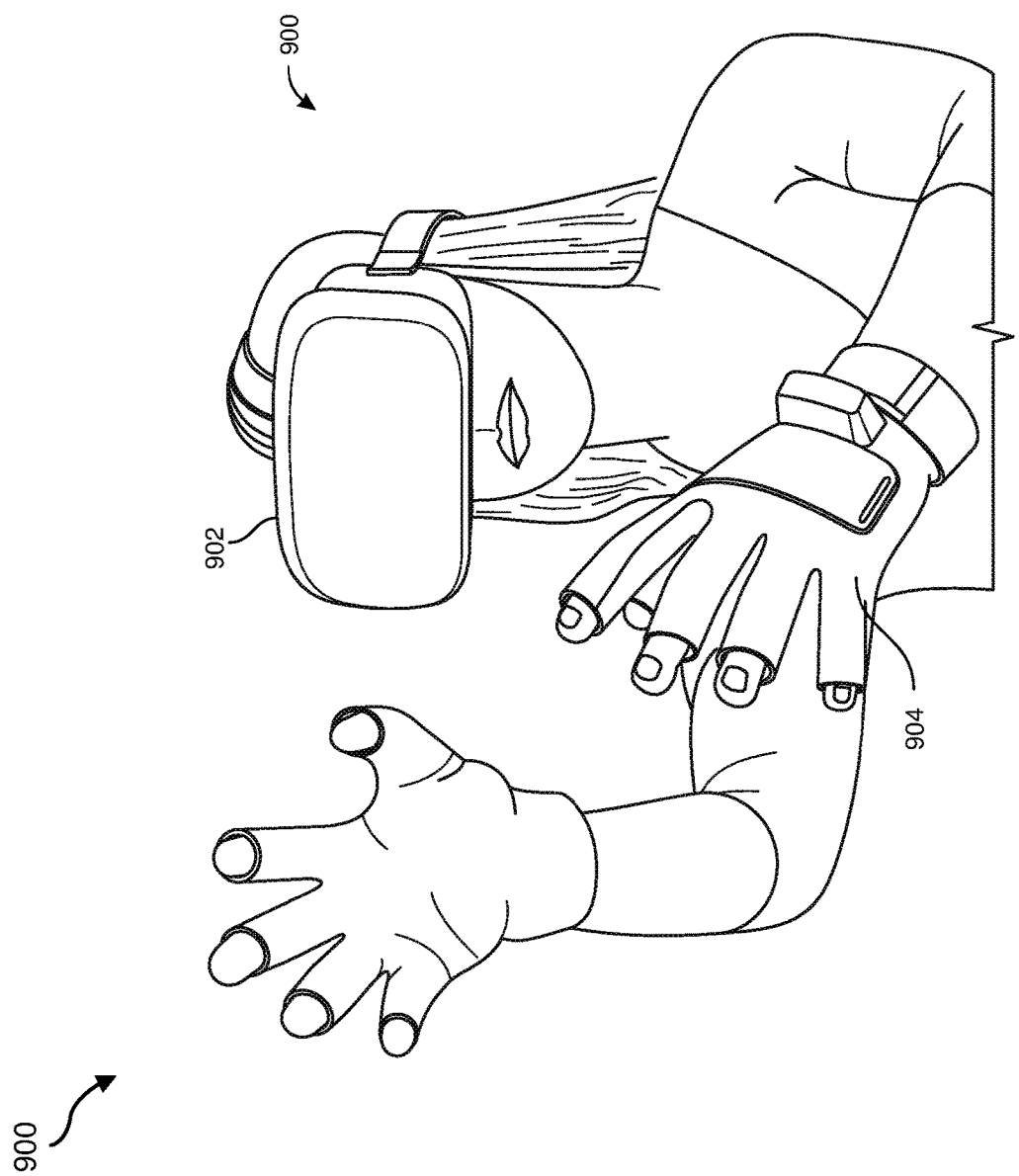
FIG. 9 is an illustration of an exemplary virtual-reality environment according to embodiments of this disclosure.

Haptic wearables, such as those shown in and described in connection with FIG. 8, may be implemented in a variety of types of artificial-reality systems and environments. FIG. 9 shows an example artificial-reality environment 900 including one head-mounted virtual-reality display and two haptic devices (i.e., gloves), and in other embodiments any number and/or combination of these components and other components may be included in an artificial-reality system. For example, in some embodiments there may be multiple HMDs each having an associated haptic device, with each HMD and each haptic device communicating with the same console, portable computing device, or other computing system.

Figure 7:
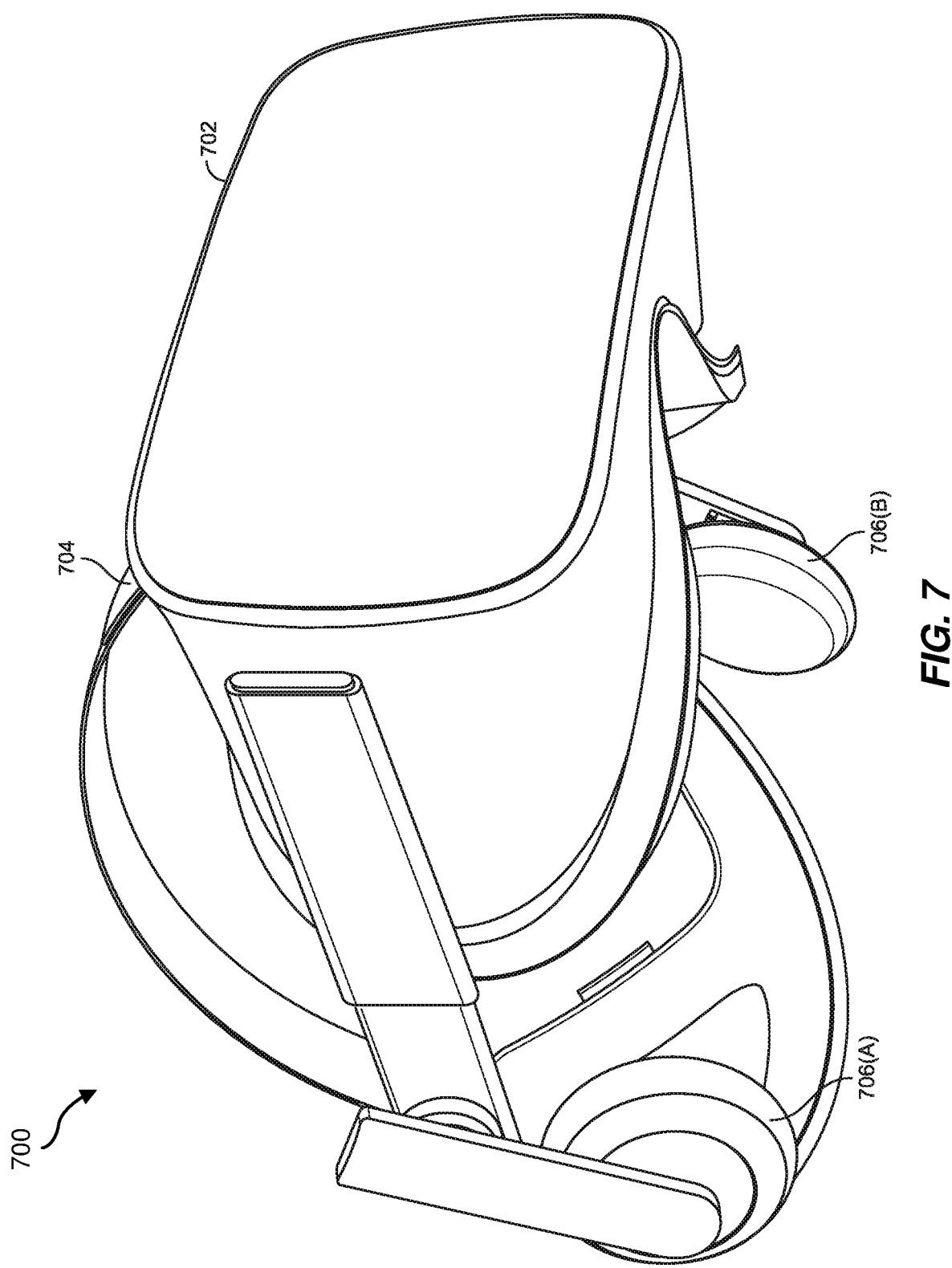
FIG. 7 is an illustration of an exemplary virtual-reality headset that may be used in connection with embodiments of this disclosure.

HMD 902 generally represents any type or form of virtual-reality system, such as the virtual-reality system 700 in FIG. 7. Haptic device 904 generally represents any type or form of wearable device, worn by a user of an artificial-reality system, that provides haptic feedback to the user to give the user the perception that he or she is physically engaging with a virtual object. In some embodiments, the haptic device 904 may provide haptic feedback by applying vibration, motion, and/or force to the user. For example, the haptic device 904 may limit or augment a user's movement. To give a specific example, the haptic device 904 may limit a user's hand or finger from moving forward so that the user has the perception that his or her hand or finger has come in physical contact with a virtual wall or other virtual object. In this specific example, one or more actuators within the haptic device may achieve the physical-movement restriction by pumping fluid into an inflatable bladder of the haptic device. In some examples, any of the lockable beams 104, 200, 300 described above may be implemented in the haptic device 904 to limit the user's movement. In some examples, a user may also use the haptic device 904 to send action requests to a console. Examples of action requests include, without limitation, requests to start an application and/or end the application and/or requests to perform a particular action within the application.

Figure 10:
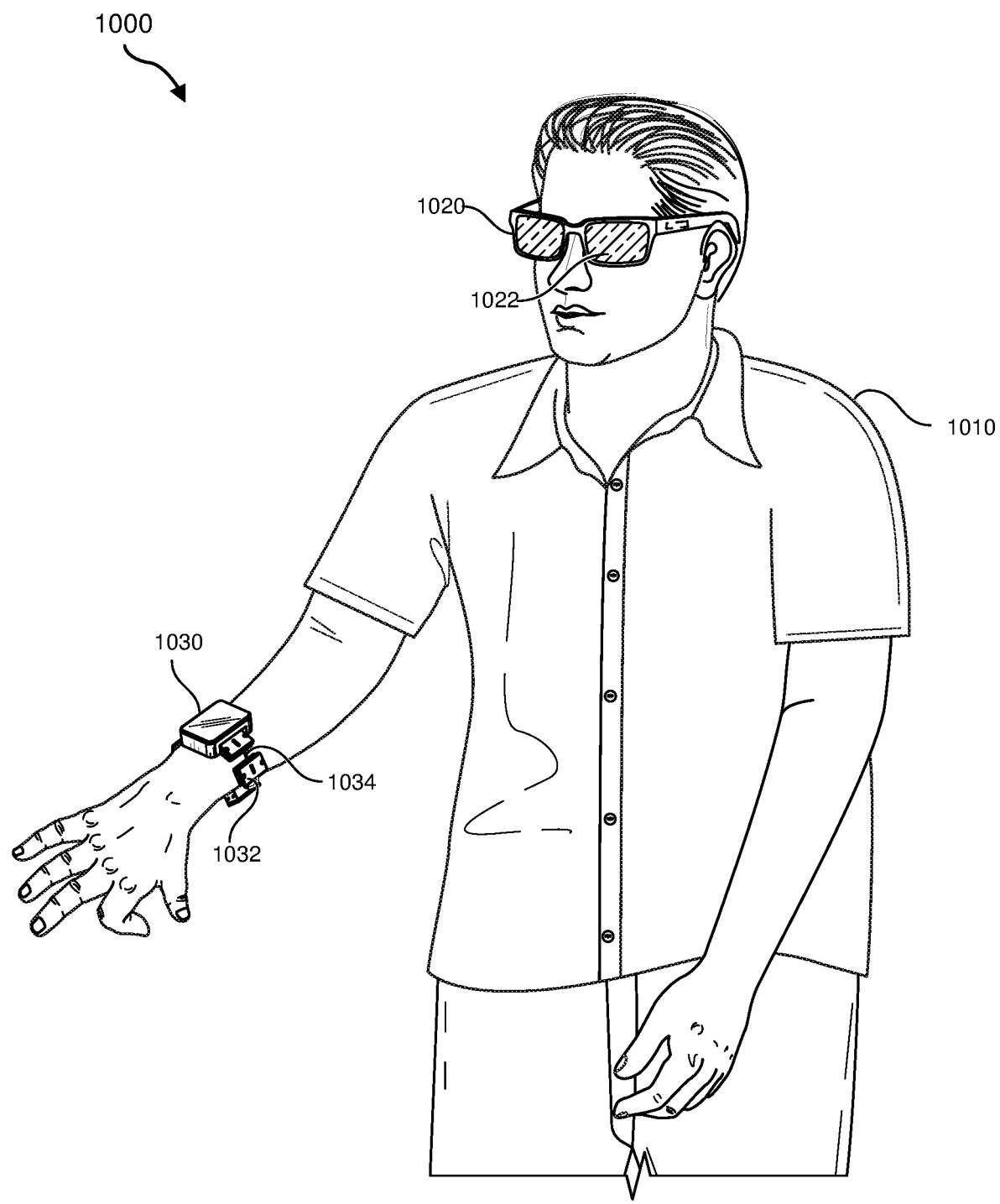
FIG. 10 is an illustration of an exemplary augmented-reality environment according to embodiments of this disclosure.

While haptic interfaces may be used with virtual-reality systems, as shown in FIG. 9, haptic interfaces may also be used with augmented-reality systems, as shown in FIG. 10. FIG. 10 is a perspective view of a user 1010 interacting with an augmented-reality system 1000. In this example, the user 1010 may wear a pair of augmented-reality glasses 1020 that may have one or more displays 1022 and that are paired with a haptic device 1030. In this example, the haptic device 1030 may be a wristband that includes a plurality of band elements 1032 and a tensioning mechanism 1034 that connects band elements 1032 to one another.

One or more of the band elements 1032 may include any type or form of actuator suitable for providing haptic feedback. For example, one or more of the band elements 1032 may be configured to provide one or more of various types of cutaneous feedback, including vibration, force, traction, texture, and/or temperature. To provide such feedback, the band elements 1032 may include one or more of various types of actuators. In one example, each of the band elements 1032 may include a vibrotactor (e.g., a vibrotactile actuator) configured to vibrate in unison or independently to provide one or more of various types of haptic sensations to a user. Alternatively, only a single band element or a subset of band elements may include vibrotactors.

The haptic devices 810, 820, 904, and 1030 may include any suitable number and/or type of haptic transducer, sensor, and/or feedback mechanism. For example, the haptic devices 810, 820, 904, and 1030 may include one or more mechanical transducers, piezoelectric transducers, and/or fluidic transducers. The haptic devices 810, 820, 904, and 1030 may also include various combinations of different types and forms of transducers that work together or independently to enhance a user's artificial-reality experience. In one example, each of the band elements 1032 of haptic device 1030 may include a vibrotactor (e.g., a vibrotactile actuator) configured to vibrate in unison or independently to provide one or more of various types of haptic sensations to a user.

The following example embodiments are also included in the present disclosure.

Example 1: A lockable beam, which may include: a rib structure including a plurality of ribs; a linking structure configured to maintain the ribs substantially perpendicular to a centroid of the lockable beam; a tendon extending along the rib structure; a tensioner coupled to the tendon for applying tension to the tendon; and a locking mechanism configured to, when engaged, impede relative movement between the tendon and the rib structure in a manner that impedes bending of the lockable beam.

Example 2: The lockable beam of Example 1, wherein the tensioner includes a rotational spring.

Example 3: The lockable beam of Example 1 or Example 2, wherein the plurality of ribs interlock with each other.

Example 4: The lockable beam of Example 3, wherein each of the ribs of the plurality of ribs includes an interlocking feature for interlocking with an adjacent rib of the plurality of ribs.

Example 5: The lockable beam of Example 4, wherein the interlocking feature is positioned on an opposite side of the rib structure from the tendon.

Example 6: The lockable beam of any of Examples 1 through 5, wherein the locking mechanism includes an electromechanical actuator.

Example 7: The lockable beam of any of Examples 1 through 6, wherein the locking mechanism includes at least one of: a clamp; a rotating cam; a lever; or a linear actuator.

Example 8: The lockable beam of any of Examples 1 through 7, wherein each rib of the plurality of ribs includes a circular outer peripheral shape.

Example 9: The lockable beam of any of Examples 1 through 8, wherein the tendon includes a shape memory alloy material.

Example 10: The lockable beam of any of Examples 1 through 9, the tensioner includes an electromechanical actuator.

Example 11: The lockable beam of any of Examples 1 through 10, further including a sheath surrounding the rib structure.

Example 12: The lockable beam of any of Examples 1 through 11, further including a linking structure coupled to the rib structure and configured to maintain the ribs substantially perpendicular to a centroid of the lockable beam during bending of the lockable beam.

Example 13: A haptics glove, which may include: a glove including finger portions; and at least one lockable beam positioned along at least one of the finger portions, the lockable beam including: a plurality of ribs; a linking structure configured to maintain the plurality of ribs substantially perpendicular to a centroid of the at least one lockable beam; a tendon extending along the plurality of ribs; a tensioner coupled to at least one end of the tendon; and a locking mechanism positioned to impede movement of the tendon relative to at least one rib of the plurality of ribs when the locking mechanism is engaged.

Example 14: The haptics glove of Example 13, further including a finger pad coupling the lockable beam to the corresponding finger portion of the glove.

Example 15: The haptics glove of Example 13 or Example 14, wherein the lockable beam is positioned along an inner side or a back side of the corresponding finger portion of the glove.

Example 16: The haptics glove of any of Examples 13 through 15, wherein at least two lockable beams are positioned along one of the finger portions.

Example 17: The haptics glove of any of Examples 13 through 16, wherein the tensioner includes a spring element.

Example 18: The haptics glove of any of Examples 13 through 17, further including a communications element configured to communicate with a head-mounted display for displaying virtual images with which an intended user may interact using the haptics glove.

Example 19: A method of forming a haptics glove, which may include: forming a lockable beam, including: positioning a tendon along a plurality of ribs; coupling a tensioner to at least one end of the tendon; and operably coupling a locking mechanism to the tendon to impede movement of the tendon relative to the plurality of ribs when the locking mechanism is engaged; and positioning the lockable beam along a finger portion of a glove and coupling the lockable beam to the finger portion of the glove.

Example 20: The method of Example 19, wherein coupling the lockable beam to the finger portion of the glove includes coupling an end of the lockable beam to a finger pad positioned at a fingertip portion of the finger portion of the glove.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. By way of example and not limitation, the operations 520, 530, and/or 540 may be performed in any order. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A lockable beam, comprising:
a rib structure including a plurality of ribs;
a linking structure configured to maintain the ribs substantially perpendicular to a centroid of the lockable beam;
a tendon extending along the rib structure;
a tensioner coupled to the tendon for applying tension to the tendon; and
a locking mechanism configured to, when engaged, impede relative movement between the tendon and the rib structure in a manner that impedes bending of the lockable beam.

2. The lockable beam of claim 1, wherein the tensioner comprises a rotational spring.

3. The lockable beam of claim 1, wherein the plurality of ribs interlock with each other.

4. The lockable beam of claim 3, wherein each of the ribs of the plurality of ribs comprises an interlocking feature for interlocking with an adjacent rib of the plurality of ribs.

5. The lockable beam of claim 4, wherein the interlocking feature is positioned on an opposite side of the rib structure from the tendon.

6. The lockable beam of claim 1, wherein the locking mechanism comprises an electromechanical actuator.

7. The lockable beam of claim 1, wherein the locking mechanism comprises at least one of:
a clamp;
a rotating cam;
a lever; or
a linear actuator.

8. The lockable beam of claim 1, wherein each rib of the plurality of ribs comprises a circular outer peripheral shape.

9. The lockable beam of claim 1, wherein the tendon comprises a shape memory alloy material.

10. The lockable beam of claim 1, wherein the tensioner comprises an electromechanical actuator.

11. The lockable beam of claim 1, further comprising a sheath surrounding the rib structure.

12. The lockable beam of claim 1, further comprising a linking structure coupled to the rib structure and configured to maintain the ribs substantially perpendicular to the centroid of the lockable beam during bending of the lockable beam.

13. A haptics glove, comprising:
a glove including finger portions; and
at least one lockable beam positioned along at least one of the finger portions, the lockable beam comprising:
a plurality of ribs;
a linking structure configured to maintain the plurality of ribs substantially perpendicular to a centroid of the at least one lockable beam;
a tendon extending along the plurality of ribs;
a tensioner coupled to at least one end of the tendon; and
a locking mechanism positioned to impede movement of the tendon relative to at least one rib of the plurality of ribs when the locking mechanism is engaged.

14. The haptics glove of claim 13, further comprising a finger pad coupling the lockable beam to the corresponding finger portion of the glove.

15. The haptics glove of claim 13, wherein the lockable beam is positioned along an inner side or a back side of the corresponding finger portion of the glove.

16. The haptics glove of claim 13, wherein at least two lockable beams are positioned along one of the finger portions.

17. The haptics glove of claim 13, wherein the tensioner comprises a spring element.

18. The haptics glove of claim 13, further comprising a communications element configured to communicate with a head-mounted display for displaying virtual images with which an intended user may interact using the haptics glove.

19. A method of forming a haptics glove, the method comprising:
forming a lockable beam, comprising:
positioning a tendon along a plurality of ribs;
coupling a tensioner to at least one end of the tendon; and
operably coupling a locking mechanism to the tendon to impede movement of the tendon relative to the plurality of ribs when the locking mechanism is engaged; and
positioning the lockable beam along a finger portion of a glove and coupling the lockable beam to the finger portion of the glove.

20. The method of claim 19, wherein coupling the lockable beam to the finger portion of the glove comprises coupling an end of the lockable beam to a finger pad positioned at a fingertip end of the finger portion of the glove.

* * * * *